Nov. 13, 1962 M. E. HOVER 3,063,302
QUICK ADJUSTABLE SCREW MEANS
Filed Nov. 7, 1960
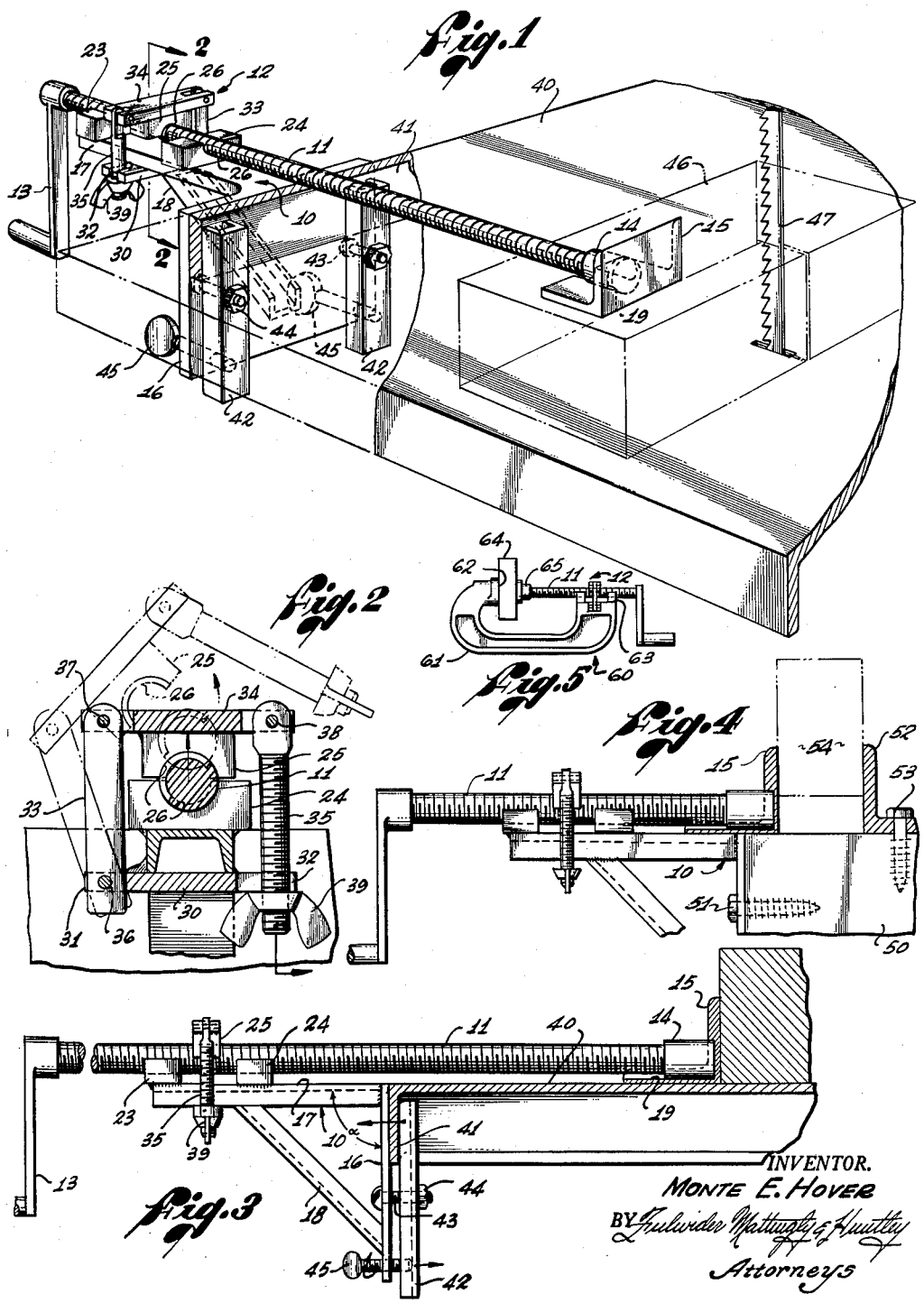
INVENTOR.
MONTE E. HOVER
BY
Attorneys

United States Patent Office 3,063,302
Patented Nov. 13, 1962

3,063,302
QUICK ADJUSTABLE SCREW MEANS
Monte E. Hover, 8211 West Ave., E–12,
Lancaster, Calif.
Filed Nov. 7, 1960, Ser. No. 67,723
3 Claims. (Cl. 74—424.8)

This invention relates to screw means, and more particularly to a screw means incorporating a guiding and locking unit which may be quickly disengaged to permit rapid advancement or retraction of a screw.

One particularly useful application of the invention is as a feeder mechanism for a band saw. For illustrative purposes, the invention is described in detail as especially constructed for this application. However, it will be understood there are numerous other equally useful applications and the detailed description of this one is not intended to limit the scope of the claims.

In the past it has been the usual practice when cutting stock with a band saw to feed the stock to the saw by hand. This practice has many serious disadvantages.

From the safety standpoint, it is a dangerous practice. The stock or the hand frequently slip, resulting in the operator sustaining injury even when cutting relatively large pieces of stock. Moreover, the probability of the operator's sustaining injury, of course, increases when cutting a small piece of stock, as it is then necessary that the hands pass close to the cutting blade.

Another disadvantage of feeding stock to a band saw by hand is in the quality of the resulting cut. It is exteremely difficult to maintain the stock by hand in a given angular orientation relative to the blade, as when making a straight cut.

Still another disadvantage is that it is virtually impossible to feed the stock by hand to the cutting blade at a constant rate. This results in an uneven cutting pressure being applied and in rapid wear of the saw blade.

It is therefore a major object of the invention to provide a screw means incorporating a guiding and locking unit adapted to be disengaged to permit rapid advancement and retraction of the screw without necessitating screw-rotation.

Another object of this invention is to provide a feeder mechanism for a band saw which obviates the aforementioned disadvantages of feeding the stock by hand.

A further object is to provide a screw means of the type described including means for adjusting the resistance of the screw to rotation.

Still another object of the invention is to provide a screw means which has essentially no play or backlash.

A still further object is to provide a screw means which is reliable and durable in operation, yet which may be economically manufactured.

These and other objects of the invention will be better understood by referring to the following detailed description taken in conjunction with the accompanying drawings, in which:

FIGURE 1 is a perspective view of the screw means as constructed for use as a feeder mechanism for a band saw;

FIGURE 2 is a section taken on line 2—2 of FIGURE 1;

FIGURE 3 is a side elevational view of the feeder mechanism as shown in FIGURE 1, certain parts being broken away and removed to show underlying parts more clearly;

FIGURE 4 is a side elevational view of the screw means adapted for use as a bench vise; and FIGURE 5 is a side elevational view of the screw means adapted for use as a C-clamp.

Referring to FIGURE 1, the screw means, as constructed for use as a feeder mechanism, includes generally a frame 10, a threaded shaft or screw 11 which is rotatably and axially movable relative to the frame, and a guiding and locking unit 12 secured to the frame. A crank 13 is provided at one end of the shaft 11, and a stock-engaging foot and shoe arrangement 14 and 15 are provided on the opposite end of the shaft. The various elements of the mechanism are preferably constructed of a good quality steel or other metal, although other materials may be used depending on the particular application.

The frame 10 comprises a vertically arranged mounting plate 16 and a substantially horizontally arranged channel or base 17 welded at one of its ends to the upper marginal portion of the mounting plate. For reasons which will later be explained, the angle α (FIGURE 3) between the plate 16 and the base 17 is preferably slightly more than 90°, for example 90¼°. That is to say, the base 17 tilts downwardly from its outer end to its connection with the plate 16 at a ¼ degree angle. An angular support 18 is welded at its opposite ends to the plate 16 and the base 17 to provide the frame 10 with additional strength.

As previously noted, the shaft 11 is mounted on the frame 10 and adapted for relative rotational and axial movement with respect to the frame. In order that the shaft 11 may be conveniently rotated, it is provided at one of its ends with the previously mentioned crank 13. Rotatably connected to the opposite end of the shaft 11 is the cylindrical foot 14 which, in turn, is slidably fit in a socket 19 formed by a coaxial cylindrical bore and groove configuration in the shoe, as illustrated in FIGURE 3. For illustrative purposes, the shoe 15 is here shown as an angle having equal legs. However, depending upon the shape of the stock to be fed to the saw, the shoe may take a variety of shapes.

It is desired that rotation of the shaft 11 produce axial movement of the shaft in a plane parallel to that of the base 17. To accomplish this, a pair of laterally spaced fixed guides 23 and 24 and an intermediate movable guide 25 are provided on the base 17. Each of the guides 23, 24 and 25 has a semi-cylindrical shaft-receiving groove 26 having threads complementary to those on the shaft 11 and adapted to mate simultaneously therewith. It will be noted that, in essence, the fixed and movable guides are here shown in the form of half-nuts having a common axis when the movable guide 25 is in shaft-engagement, as in FIGURE 1.

With the mounting arrangement described, rotation of shaft 11 causes it to move axially relative to the frame 10. By aligning the axes of the guides 23, 24 and 25 in a plane parallel to the plane of the base 17, it is possible to establish the plane of shaft movement parallel to the plane of base 17.

Providing three separate guides spaced axially along the shaft 11 serves to remove backlash or play from the shaft. In this connection, it will be appreciated that if a single guide were provided, working tolerances between the mating complementary threads on the guides 23, 24, and 25 and on the shaft 11 would tend to permit such play or backlash. On the other hand, each of the separate and longitudinally spaced guides of the present mechanism cooperates with the other ones to compensate the tolerances and thereby take up the play or backlash. This type of mounting insures that the mechanism performs in an optimum manner even in accomplishing its feeding function. In performing that last mentioned function, it is desired that a given rotation of the shaft 11 produce a corresponding axial movement thereof. It will readily be appreciated that such a relationship is possible only if play or backlash is eliminated.

It is also desired that the shaft 11 be rapidly movable from one axial position to another without necessitating rotation of the shaft in the normal manner. This desired result is accomplished by making the grooves of no more than 180° extent and by pivotally mounting the movable guide 25 on the base 17, as illustrated in FIGURE 2, so that it may be disengaged from the shaft (as shown in phantom lines in FIGURE 2), whereupon the shaft may be removed from the fixed guides 23 and 24 and advanced or retracted as desired.

As illustrated in FIGURES 1 and 2, the linkage for pivotally mounting the guide 25 to the base 17 includes a series of pin-connected links, one of which carries the movable guide 25. A bracket 30, welded to the frame 10 in such a manner that it may be considered as an extension of the frame, has slotted end portions 31 and 32 adapted to receive certain of the links. A first link or arm 33 is pin-connected at its lower end, as at 36, to the slotted end portion 31 of the bracket 30. An intermediate link or arm 34 carries the movable guide 25 and is slotted at both of its ends for pin-connection with the arm 33 and with a terminal link comprising a clevis bolt 35, as at 37 and 38, respectively. The lower end of the clevis bolt 35 is received in the slotted end portion 32 of the bracket 30 and a wing nut 39 is provided on the end of the bolt to maintain the guide 25 in shaft-engagement.

In addition to guiding the shaft 11 and providing for rapid advancement or retraction of the shaft, the unit 12 is adapted to lock the shaft in any given position relative to frame 10. It will be noted that the movable guide 25 is mounted in diametric opposition to the fixed guides 23 and 24. Thus, as the wing nut 39 is tightened down on the bolt 35, shaft 11 is clamped between the guides. This clamping may either serve to resist rotation of the shaft to an extent desired, or it may be used to completely lock it in a given position. It will further be noted that since the movable guide 25 is intermediate the fixed guides 23 and 24, tightening of the nut 39 in the manner described will, to an extent, bow the shaft downwardly in the region between the fixed guides. This bowing action serves to provide tight locking of the shaft in any given position.

In use, the feeder mechanism is adapted to be mounted on the band saw table 40, which normally is provided with a vertically depending flange 41. As may be seen in FIGURES 1 and 3, the frame 10 has a pair of mounting brackets 42 loosely secured to the plate 16 by bolts 43 and nuts 44. The mounting holes in the brackets 42 are oversize so that the brackets are free to pivot from left to right as viewed in FIGURE 3. A pair of thumb screws 45 are threadedly engaged in bores in the mounting plate 16 and project through the plate into abutment with the brackets 42. It may be seen that as the thumb screws 45 are screwed into the plate 16, the lower portions of the brackets 42 are pivoted away from the plate so that the table flange 41 is clamped between the plate 16 and the upper portion of the brackets 42.

When the mechanism is mounted for use, in the manner described above, the upper surface of the base 17 is substantially flush with the surface of the table 40, and the lower leg of the angular shoe 15 makes sliding contact with the table surface. As previously mentioned, the base 17 and the shaft 11 are mutually parallel and tilted downwardly at, for example, a ¼ degree angle with respect to the vertically arranged mounting plate 16. The purpose of this tilt is to apply a slight downward force to the shoe 15, thereby insuring that it stays in sliding engagement with the table as the shaft 11 is actuated.

Assuming that movable guide 25 initially is in engagement with the shaft 11, as in FIGURES 1 and 3, the shaft is advanced (or retracted) to the position where the shoe 15 abuts the stock 46 to be cut by one of the alternate methods. If the shoe is reasonably close to abutting the stock, the shaft 11 is merely rotated by means of the crank 13 to adjust it to the desired position. On the other hand, if the shoe is reasonably far from the desired position, the wing nut 39 is loosened so that the movable block 25 may be pivoted from its original position, shown in full lines in FIGURE 2, to disengaged position, shown in phantom lines in that figure. When the guide 25 is so disengaged, the shaft 11 may be removed from the fixed guides 23 and 24, advanced or retracted, as desired, and placed back in the guides. The linkage carrying the guide 25 is then pivoted back to the original position with the shank of bolt 35 entered in the slotted end portion 32 of the bracket 30 and the wing nut 39 tightened down on the bolt. As noted above, the tightening of the nut 39 determines the resistance of the shaft 11 to rotation. For most applications, a slight tightening is desired to aid in removing any possible backlash and insure that uniformly constant rotation of the shaft may be effected.

With the shoe 15 abutting the stock 46, as shown in FIGURE 1, the shaft 11 is then rotated by means of the crank 13 to feed the stock to the saw blade 47. If it is desired that the stock be cut completely through, the shaft is advanced until such a cut is made. However, should it be desired to stop the cutting at any given point, the shaft 11 may be locked in position by simply tightening down the nut 39 on the bolt 35, and the shoe may then serve as a guide if, for example, it is later desired to continue the cutting.

It will be appreciated that there is provided a completely safe means of feeding the stock 46, regardless of how small, to the saw blade 47. It will also be appreciated that since shaft 11 moves axially, there is provided a positive means for maintaining a desired orientation between the stock and the saw blade. This is by reason of the shaft 11 moving axially and, therefore, in a plane fixed relative to the saw blade. Further, the shaft 11 may be easily rotated by hand so as to feed the stock to the blade at a constant rate, thus maintaining a constant cutting pressure on the saw blade.

My invention also contemplates other uses. For instance, the screw means may be adapted for use as a bench vise, as shown in FIGURE 4. In such an application, the frame 10 may be secured to a bench 50 by bolts 51, as shown, or by any suitable means such as rivets or the like. A shoe 52 or the like may be bolted to the bench 50 at a desired spacing relative to the shoe 15, as at 53. In use the shaft 11 is advanced to clamp an object 54 between the movable shoe 15 and the fixed shoe 52. Advancement or retraction of the shaft is accomplished in the same manner as described above.

It will be appreciated that by providing suitable quick disconnects for securing the shoe 52 at various positions on the bench 50, the vise has a great deal of flexibility. That is to say, objects of a wide variety of sizes and shapes may be quickly and securely held in the vise.

Still another use for my invention is in connection with a C-clamp 60 as shown in FIGURE 5. In this application, a C-shaped frame 61 is provided, the frame having a vertical stock-abutment surface 62 and a surface 63 for supporting the guiding and locking unit 12. The shaft 11 is adapted to be advanced or retracted and locked in the manner described above to clamp an object 64 between the abutment surface 62 on the frame and an enlarged foot 65 on the shaft.

It will, of course, be understood that the embodiments and uses illustrated and described herein are merely representative of my invention and that numerous changes in construction and arrangement are possible without departing from the spirit and scope of the invention, as defined by the appended claims.

I claim:

1. Quick adjustable screw means comprising: a pair of relatively fixed, coaxial half-nuts mounted in axially spaced relation and facing in the same direction; a screw removably engageable with said half-nuts and having a thread thereon complementary to the threads on said half-nuts; a third half-nut having an axial thickness substantially less than the spacing between said pair of half-nuts and having a thread complementary to said screw thread; means moveably mounting said third half-nut substantially axially intermediate said pair of half-nuts, spaced from the plane thereof and facing in the direction opposite thereto to removably clamp said screw between said pair of half-nuts on one side and said third half-nut on the other side; and means for adjustably forcing said third half-nut against the screw and thereby the screw against the pair of half-nuts to apply a substantial bending moment to the screw between the opposed half-nuts.

2. Quick adjustable screw means comprising: a first half-nut guide; means mounting said guide in relatively fixed relation to face in one direction; a screw removably engageable with said guide and having a thread thereon complementary to the thread on said guide; a second half-nut guide having a thread therein complementary to the thread on said screw, means movably mounting said second guide in axial alignment with said first guide, spaced from the plane thereof and facing opposite to said one direction to removably clamp the screw between said guides in threaded relation thereto, said mounting means for the second guide comprising an articulated member having a fixed pivot mounting the member and a movable pivot thereon between the fixed pivot and the engagement of the second guide on the member whereby said second guide may partake of movement through both said fixed and movable pivots; and means adjustably holding said member to clamp the screw between said guides.

3. Quick adjustable screw means comprising: a pair of relatively fixed, coaxial half-nuts mounted in axially spaced relation and facing in the same direction; a screw removably engageable with said half-nuts and having a thread thereon complementary to the threads on said half-nuts; a third half-nut having a thread thereon complementary to said screw thread; means movably mounting said third half-nut substantially axially intermediate said pair of half-nuts, spaced from the plane thereof and facing in the direction opposite thereto to removably clamp said screw between said pair of half-nuts on one side and said third half-nut on the other side, said mounting means for said third half-nut forming a substantially rectangular frame when closed, with the sides of said frame pivoted at three corners and separably and adjustably connected at the fourth corner; means fixedly mounting one of the frame sides connected to said fourth corner; and means mounting said third half-nut to the frame side directly opposite to said fixed frame side.

References Cited in the file of this patent

UNITED STATES PATENTS

| | | |
|---|---|---|
| 667,277 | Williams | Feb. 5, 1901 |
| 742,647 | Herriman | Oct. 27, 1903 |
| 1,036,386 | Van Denburg | Aug. 20, 1912 |
| 1,284,124 | Mozier | Nov. 5, 1918 |
| 1,683,912 | Neblett | Sept. 11, 1928 |
| 1,954,708 | Mass | Apr. 10, 1934 |